United States Patent Office 2,844,457  
Patented July 22, 1958

2,844,457

LUMP ORES AND METHODS OF PRODUCING THEM

Charles R. Amberg, Cortlandt Township, Westchester County, N. Y., assignor to Blocked Iron Corporation, Albany, N. Y., a corporation of New York No Drawing. Application November 22, 1954  
Serial No. 470,523

17 Claims. (Cl. 75—3)

This invention relates to lump ores and to methods of producing them and particularly to a lump ore and method of producing such an ore from finely divided materials containing metals in the metallic state, as metallic compounds such as oxides or mixtures thereof. The invention is particularly adapted to the production of lump iron ores from finely divided iron ores, blast furnace flue dust and other sources of iron and iron compounds which are available in a fine state of subdivision.

This application is a continuation in part of my presently copending application Serial No. 428,814, filed May 10, 1954, now abandoned.

In the case of iron ore, for example, natural reserves of high grade lump ores are rapidly being depleted by selective mining. It has been increasingly necessary to utilize the more finely divided high grade ores as well as to turn to low grade ores which must be beneficiated. In the benefication of low grade ores for use in the blast furnace and open hearth, particularly in the case of taconite, it is necessary to grind the ore to pass through a 200 to 325 mesh screen in order to separate the impurities and make a commercially acceptable product. In addition to these natural ores there are large quantities of blast furnace flue dust, fine scale, and similar other sources of iron and iron compounds available in the finely divided state available for use in iron and steel-making processes. However, these materials, because of their fineness, tend to fuse and bridge over or to be flushed out with the early slag before accomplishing their metallurgical function in the open hearth steel-making furnace or to be carried out through the top of the blast furnace in iron making and are not suitable in their naturally occurring condition for use in open-hearth steel-making furnaces or in blast furnaces. In order to take advantage of these materials, it has been the practice to take these finely divided materials and either sinter, pelletize or nodulize them by heating to high temperatures or by bonding them together with hydraulic cement. All of these practices are relatively expensive and in some instances are undesirable because of the increased amounts of impurities such as silica and alumina which are introduced into the ore by the bonding practice.

I have discovered an improved lump ore product produced from such finely divided materials and a method of producing it. The lump ores produced according to my invention are free from the objections common to the presently used ores produced by sintering, pelletizing and nodulizing finely divided materials. The lump ore of this invention has the desirable thermal and chemical characteristics of natural lump ore, and has the strength and resistance to crushing characteristic of natural lump ores. The lump ore of this invention is, moreover, free from undesirable added impurities, contains bonding materials similar to the fluxing materials normally used in metallurgical practices and may be formed of blended or mixed iron-containing materials.

I provide a lump ore product produced from finely divided metal-containing material (by "metal-containing material" I mean a material containing a metal, a metallic compound such as oxides or mixtures thereof) having a formed matrix of the finely divided material bound together by alkaline earth carbonate under certain conditions to be outlined hereinafter. Preferably the lump ore product is produced by the steps of admixing the finely divided material with at least one of the group consisting of the oxides and hydroxides of the alkaline earth metals and reacting the resulting admixture with carbon dioxide under certain critical conditions.

In the preferred practice of my invention I admix the finely divided metal-containing material with an oxide or hydroxide of calcium, mixed calcium and magnesium, e. g., dolomitic lime or mixtures thereof, in the presence of moisture, this admixture is then formed into lumps by any of the conventional methods such as pressing, extrusion, vibrating, moulding or pelletizing. The formed lumps are then treated with carbonic acid gas (carbon dioxide) either as the pure gas or with impurities such as the nitrogen, oxygen, carbon monoxide and water vapor ordinarily found in products of combustion.

I have discovered that the moisture content of the formed lumps at the time of treatment with carbon dioxide is critical and should not exceed about 10%. Preferably the moisture content should be between about 2% and 6% for most ores. I have found, however, that larger amounts of moisture are permissible with the finer ores than with the coarser ores and that the maximum for coarse ores will be somewhat below 10%. The maximum moisture content appears to be related to the surface area of the ore, which is in turn a function of the fineness, however, 10% seems to be the maximum moisture for all types of ores and flue dust.

I have found that by controlling the moisture content of the lime and ore mix as outlined above, I am able to treat the lumps at atmospheric pressure to produce a completely satisfactory product. I have found, however, that variations in pressure above or below atmospheric pressure are not detrimental. I have carried out the treatment according to my invention at pressures up to 50 pounds per square inch with satisfactory results, however, I have found that in some instances pressures as high as this are detrimental and accordingly I prefer to practice my invention at atmospheric pressure.

The importance of controlling the moisture content will be apparent from the following examples:

EXAMPLE I

Taconite magnetic concentrates, a finely divided iron ore, was mixed with 7% of hydrated lime and with varying percentages of moisture as appears in Table I. The moistened ore and lime mix was briquetted and treated with carbon dioxide at atmospheric pressure. The resulting briquettes were tumbled in an A. S. T. M. coke tumbler for 50 revolutions and the residue on a United States Standard 30 mesh screen determined. The results appear in Table I.

Table I

| Percent Moisture | Percent on U. S. Standard 30 Mesh Screen After Tumbling |
|---|---|
| 2 | 88 |
| 4 | 88 |
| 5 | 89 |
| 6 | 93 |
| 7 | 91 |
| 8 | 88 |
| 9 | 60 |
| 10 | 51 |
| 12 | 49 |

It is clear from the table that there is a sharp break in the screen residue between 8% and 9% moisture for this particular ore. I have found that for satisfactory operation in metallurgical processes a screen residue on 30 mesh (U. S. Standard Screen) of about 75% is about the minimum acceptable. Again, reference to Table I shows that somewhere between 8% and 9% moisture the product goes from a satisfactory to an unsatisfactory classification, according to this test.

EXAMPLE II

A coarser grained natural hematite iron ore, was mixed with 7% hydrated lime and with varying percentages of moisture as appears in Table II. The moistened ore and lime mix was briquetted and treated with carbon dioxide at atmospheric pressure. The resulting material was tumbled in the same manner as Example I and the screen residue determined on 30 mesh. The results appear in Table II.

Table II

| Percent Moisture | Percent Retained on 30 Mesh Screen |
| --- | --- |
| 2 | 80 |
| 4 | 89 |
| 6 | 87 |
| 8 | 60 |

It will be noted from the results shown in Table II that there is a sharp break in the amount retained on the 30 mesh screen between 6% and 8%. This is consistent with my general observations.

I have also discovered that the reaction of my invention may be accelerated by the addition of certain soluble salts, preferably soluble carbonates, chlorides and sulfates. Preferably, I use the chlorides of iron, calcium and magnesium although the corresponding salts of sodium and other metallic ions may be used. These soluble salts when used in proper amounts, appear to improve the physical characteristics of the resulting lumps and to permit replacement of a portion of the calcium or corresponding hydroxide. I have found that amounts up to about 0.6% will improve the physical condition of a lump ore treated by my process but prefer to limit the addition to about 0.2%.

EXAMPLE III

For example, I have prepared a mixture of ore with 5% lime and varying amounts of calcium chloride as shown in Table III. This was treated with carbon dioxide in presence of about 6% moisture. The resulting lumps were tumbled as in Example I above and the screen residue determined. The results appear in Table III.

Table III

| Percent of CaCl₂ | Percent of Screen Residue on a U. S. Standard 30 Mesh Screen |
| --- | --- |
| 0 | 75 |
| .1 | 78 |
| .2 | 82 |
| .3 | 80 |
| .6 | 83 |

It is apparent from the foregoing table that the addition of the soluble $CaCl_2$ improves the screen residue of a lump containing only 5% lime by an amount in excess of 10% of the original screen residue value.

The amount of alkaline earth oxide or hydroxide in the mixture should be kept at a minimum but may vary with different ores or with different states of subdivision of the same ore. Normal ranges of alkaline earth oxide may vary from 2% to 8% of the weight of the dry ore. Again, however, the amount may be increased if desired or needed for increased structural strength in the lumps. If an alkaline earth hydroxide is used then the amount should be such as to contain an amount of oxide equivalent to about 2% to 8% on the dry weight of the ore.

The method of this invention is particularly satisfactory for the treatment of fine-grained iron ores, iron ore concentrates, blast furnace flue dust, and other finely subdivided iron-containing materials, either alone or in combination with larger sized particles to form lump ores.

Specific examples of the application of this invention to such iron-containing materials are as follows:

EXAMPLE IV

One hundred parts by weight of magnetic concentrates from Ringwood, New Jersey, were mixed with 5 parts of dolomitic hydrated lime and 5 parts of water. Blocks were formed from the admixture by pressing in a steel mould at 3000 p. s. i. The formed blocks were placed in a confining vessel which was not pressure tight. Carbon dioxide was then introduced at atmospheric pressure and maintained for 30–60 minutes. The blocks, when removed from the vessel, were subjected to 50 revolutions in the A. S. T. M. coke tumbler. Ninety percent of the material remained on a United States Standard 30 mesh screen after the treatment. Most of the material was in the form of original blocks with only the edges chipped. Blocks made by this process have been subjected to temperatures in range 1600–2000° F. in a reducing atmosphere and found to retain their shape and sufficient strength for use in the blast furnace. This performance is equal or superior to sintered iron ores produced by conventional practices.

EXAMPLE V

One hundred parts of the magnetic concentrates from Ringwood, New Jersey, were treated in the manner outlined in Example I above excepting that high calcium hydrated lime was substituted for the dolomitic lime. The resulting product had satisfactory physical properties for use in open-hearth practices.

EXAMPLE VI

One hundred parts of the magnetic concentrates from Ringwood, New Jersey, were treated in the manner outlined in Example I above excepting that finely ground high calcium quick lime was substituted for the dolomitic lime. The resulting product had satisfactory physical properties for use in open-hearth practices.

Lump ores of finely divided materials containing manganese, nickel and similar other materials used in metallurgical processes may be prepared in the same manner as the foregoing example.

EXAMPLE VII

Taconite magnetic concentrates were mixed with 7% of dolomitic hydrated lime, 0.2% calcium chloride and 9% of water. The resulting mixture was formed into balls by the pelletizing process. The pellets were then dried to a moisture content of 2–3%, placed in an open topped vessel. Carbon dioxide gas was introduced at the bottom of the vessel. After one half hour the pellets were removed and found to be hardened to a stonelike consistency.

EXAMPLE VIII

Lump ores were prepared from finely divided manganese ore and manganese-containing flue dust with the addition of 5% dolomitic lime hydrate and 6% of water, based on the dry weight of the ore and dust. Blocks were formed from the mixture by pressing in a steel mould at 3000 p. s. i. The formed blocks were placed in a vessel and carbon dioxide was introduced at atmospheric pressure for one hour. The resulting lump ore had physical properties equal to the natural lump ore.

While I have described certain preferred practices and products according to my invention, it will be understood that this invention may be otherwise practiced within the scope of the following claims.

I claim:
1. The method of producing lump ore from finely divided metal-containing materials, comprising the steps of admixing the finely divided material with at least one of the group consisting of the oxides and hydroxides of alkaline earth metals and reacting the resulting mixture with carbon dioxide in the presence of up to about 10% moisture in the admixture.

2. The method of producing lump ore from finely divided metal-containing materials, comprising the steps of admixing the finely divided material with at least one of the group consisting of the oxides and hydroxides of magnesium and calcium, and mixtures thereof and reacting the resulting mixture with carbon dioxide in the presence of up to about 10% moisture.

3. The method of producing lump ore from finely divided metal-containing materials, comprising the steps of admixing the finely divided material with at least one of the group consisting of the oxides and hydroxides of alkaline earth metals and reacting the resulting mixture with carbonic acid gas in the presence of up to about 10% moisture and at least one soluble salt from the group consisting of chlorides, sulfates and carbonates of alkali metals, alkaline earth metals and iron.

4. The method of producing lump ore from finely divided metal-containing materials, comprising the steps of admixing the finely divided material with at least one of the group consisting of the oxides and hydroxides of alkaline earth metals in the presence of moisture, forming the resulting mixture into lumps and reacting the formed lumps with carbonic acid gas in the presence of up to about 10% moisture to cause crystallization of alkaline earth carbonates in the interstices of the formed lumps.

5. The method of producing lump iron ore from finely divided iron-containing materials, comprising the steps of admixing the finely divided material with at least one of the group consisting of the oxides and hydroxides of alkaline earth metals and reacting the resulting mixture of alkaline earth metals and reacting the resulting mixture with carbon dioxide in the presence of up to about 10% moisture.

6. The method of producing lump iron ore from finely divided iron-containing materials, comprising the steps of admixing the finely divided material with at least one of the group consisting of the oxides and hydroxides of magnesium, calcium, strontium and barium and mixtures thereof and reacting the resulting mixture with carbon dioxide in the presence of up to about 10% moisture.

7. The method of producing lump iron ore from finely divided iron-containing materials, comprising the steps of admixing the finely divided material with at least one of the group consisting of the oxides and hydroxides of alkaline earth metals and reacting the resulting mixture with carbonic acid gas in the presence of up to about 10% moisture and at least one soluble salt from the group consisting of the chlorides, sulfates and carbonates of the alkali metals, alkaline earth metals and iron.

8. The method of producing lump iron ore from finely divided iron-containing materials, comprising the steps of admixing the finely divided material with at least one of the group consisting of the oxides and hydroxides of alkaline earth metals in the presence of moisture, forming the resulting mixture into lumps and reacting the formed lumps with carbonic acid gas in the presence of up to about 10% moisture to cause crystallization of alkaline earth carbonates in the interstices of the formed lumps.

9. The method of producing lump iron ore from finely divided iron-containing materials comprising the steps of admixing the finely divided material with at least one of the group consisting of the oxides and hydroxides of magnesium and calcium, and mixtures thereof in the presence of moisture, forming the resulting mixture into lumps and reacting the formed lumps with carbonic acid gas at a partial pressure of carbon dioxide of not exceeding 50 pounds per square inch in the presence of up to about 10% moisture to cause conversion of at least a part of the admixed member of the group oxide and hydroxide to carbonate.

10. The method of producing lump iron ore from finely divided iron-containing materials, comprising the steps of admixing the finely ground material with at least one of the group consisting of the alkaline earth metal oxides and hydroxides in an amount equivalent to about 2% to 8% of oxide based on the dry weight of the ore, forming the resulting mixture into lumps in the presence of up to about 10% moisture, and reacting the formed lumps with carbon dioxide to convert at least a part of the admixed member of the group oxide and hydroxide to carbonate.

11. A lump ore product produced from finely divided metal-containing materials, comprising a formed matrix of said finely divided material bound together by alkaline earth carbonate and formed by the steps of admixing the finely divided material with at least one of the group consisting of the oxides and hydroxides of alkaline earth metals in the presence of moisture, forming the resulting mixture into lumps and reacting the formed lumps with carbonic acid gas in the presence of up to about 10% moisture at atmospheric pressure to cause crystallization of alkaline earth carbonates in the interstices of the formed lumps.

12. A lump iron ore produced from finely divided iron-containing materials, comprising a formed matrix of said material bound together by alkaline earth carbonate and formed by the steps of admixing the finely ground material with at least one of the group consisting of the alkaline earth metal oxides and hydroxides in an amount equivalent to about 2% to 8% of oxide on the dry weight of the ore, forming the resulting mixture into lumps in the presence of moisture, and reacting the formed lumps with carbon dioxide in the presence of up to about 10% moisture to convert at least a part of the admixed member of the group oxide and hydroxide to carbonate.

13. The method of producing lump manganese ore from finely divided manganese-containing materials, comprising the steps of admixing the finely divided material with at least one of the group consisting of the oxides and hydroxides of alkaline earth metals and reacting the resulting mixture with carbon dioxide in the presence of up to about 10% moisture.

14. A lump manganese ore produced from finely divided manganese-containing materials comprising a formed matrix of said material bound together by alkaline earth carbonate and formed by the steps of admixing the finely divided material with at least one of the group consisting of the oxides and hydroxides of alkaline earth metals and reacting the resulting mixture with carbon dioxide in the presence of up to about 10% moisture.

15. The method of producing lump nickel ore from finely divided nickel-containing materials, comprising the steps of admixing the finely divided material with at least one of the group consisting of the oxides and hydroxides of alkaline earth metals and reacting the resulting mixture with carbon dioxide in the presence of up to about 10% moisture.

16. A lump nickel ore produced from finely divided nickel-containing materials comprising a formed matrix of said material bound together by alkaline earth carbonate and formed by the steps of admixing the finely divided material with at least one of the group consisting of the oxides and hydroxides of alkaline earth metals and reacting the resulting mixture with carbon dioxide in the presence of up to about 10% moisture.

17. The method of producing a lump ore from finely divided metal containing materials comprising the steps of admixing the finely divided material with about 2% to 8% of at least one of the group consisting of the oxides and hydroxides of calcium and magnesium and mixtures thereof based on the dry weight of the ore, forming the resulting mixture into lumps in the presence of moisture, controlling the moisture within the limits of 1% to 10% based on the weight of the mixture and reacting the formed lumps of controlled moisture content with carbon dioxide at atmospheric pressure.

References Cited in the file of this patent

UNITED STATES PATENTS

| | | |
|---|---|---|
| 711,059 | Long | Oct. 14, 1902 |
| 899,581 | Weiss | Sept. 29, 1908 |
| 1,029,182 | Folliet | June 11, 1912 |
| 2,277,663 | Francis et al. | Mar. 31, 1942 |
| 2,394,793 | Maier | Feb. 12, 1946 |